US012694297B2

(12) United States Patent
Kailas et al.

(10) Patent No.: US 12,694,297 B2
(45) Date of Patent: Jul. 28, 2026

(54) SYSTEM, METHOD AND COMPUTER-ACCESSIBLE MEDIUM FOR MAKING A PREDICTION FROM MARKET DATA

(71) Applicants: New York University, New York, NY (US); INTELLIGENCE TECHNOLOGIES, LLC, New York, NY (US)

(72) Inventors: George Kailas, New York, NY (US); Sean Hannley, Tucson, AZ (US); Bhubaneswar Mishra, Great Neck, NY (US)

(73) Assignees: New York University, New York, NY (US); Intelligence Technologies LLC, New York, NY (US)

( * ) Notice: Subject to any disclaimer, the term of this patent is extended or adjusted under 35 U.S.C. 154(b) by 1006 days.

(21) Appl. No.: 15/573,786

(22) PCT Filed: May 12, 2016

(86) PCT No.: PCT/US2016/032225
§ 371 (c)(1),
(2) Date: Nov. 13, 2017

(87) PCT Pub. No.: WO2016/183391
PCT Pub. Date: Nov. 17, 2016

(65) Prior Publication Data
US 2018/0129961 A1 May 10, 2018

Related U.S. Application Data

(60) Provisional application No. 62/160,311, filed on May 12, 2015.

(51) Int. Cl.
G06N 3/086 (2023.01)
G06F 16/242 (2019.01)
(Continued)

(52) U.S. Cl.
CPC .......... *G06N 3/086* (2013.01); *G06F 16/244* (2019.01); *G06N 3/12* (2013.01); *G06N 20/00* (2019.01);
(Continued)

(58) Field of Classification Search
CPC .......... G06N 7/005; G06N 3/086; G06N 3/12; G06N 20/00; G06F 16/244
See application file for complete search history.

(56) References Cited

U.S. PATENT DOCUMENTS 6,466,929 B1 10/2002 Brown et al.
8,321,422 B1 * 11/2012 Kwatra ............... G06F 18/2135
707/743
(Continued)

OTHER PUBLICATIONS

R. Chandra, "Competitive two-island cooperative coevolution for training Elman recurrent networks for time series prediction," 2014 International Joint Conference on Neural Networks (IJCNN), 2014, pp. 565-572, doi: 10.1109/IJCNN.2014.6889421. (Year: 2014).*

(Continued)

*Primary Examiner* — James D. Rutten
(74) *Attorney, Agent, or Firm* — HUNTON ANDREWS KURTH LLP

(57) ABSTRACT

An exemplary system, method and computer-accessible medium for generating a model(s), can include, for example, receiving first information related to raw data, generating second information by formatting the first information, generating third information related to a feature set(s) of the second information, generating the model(s) based on the second and third information. Fourth information related to a user-defined regularization of the second information can be received, fifth information can be generated based on a reformatting of the second information using the fourth information. A prediction(s) can be generated based on the (Continued)

model(s). The prediction(s) can be generated based on a time horizon(s).

22 Claims, 10 Drawing Sheets

(51) Int. Cl.

| | | |
|---|---|---|
| *G06N 3/12* | (2023.01) |
| *G06N 20/00* | (2019.01) |
| *G06N 7/01* | (2023.01) |
| *G06Q 10/00* | (2026.01) |
| *G06Q 30/0202* | (2023.01) |
| *G06Q 40/00* | (2023.01) |

(52) U.S. Cl.
CPC .............. *G06N 7/01* (2023.01); *G06Q 10/00* (2013.01); *G06Q 30/0202* (2013.01); *G06Q 40/00* (2013.01)

(56) References Cited

U.S. PATENT DOCUMENTS

| | | | | |
|---|---|---|---|---|
| 2004/0260728 | A1* | 12/2004 | Mika ...................... G06Q 40/12 |
| 2005/0142529 | A1* | 6/2005 | Andreyev ............... G09B 7/02 |
| | | | | 434/323 |

| | | | | |
|---|---|---|---|---|
| 2005/0209982 | A1* | 9/2005 | Jin ......................... G06N 3/126 |
| | | | | 706/19 |
| 2006/0064415 | A1* | 3/2006 | Guyon ................... G16B 40/00 |
| 2008/0263507 | A1 | 10/2008 | Chang et al. |
| 2009/0083195 | A1* | 3/2009 | Aymeloglu ............ G06Q 10/04 |
| | | | | 705/36 R |
| 2009/0257081 | A1* | 10/2009 | Bouchard .............. G06Q 10/10 |
| | | | | 358/1.15 |
| 2010/0256988 | A1 | 10/2010 | Barnhill et al. |
| 2011/0243426 | A1* | 10/2011 | Hu ..................... G06V 10/7747 |
| | | | | 382/159 |
| 2011/0263437 | A1* | 10/2011 | Fang .................... C12Q 1/6888 |
| | | | | 506/7 |
| 2013/0165143 | A1* | 6/2013 | Ziskind ................... H04W 4/02 |
| | | | | 455/456.1 |
| 2017/0063912 | A1* | 3/2017 | Muddu ................ G06V 10/225 |

OTHER PUBLICATIONS

L. Moonen, "Lightweight impact analysis using island grammars," Proceedings 10th International Workshop on Program Comprehension, 2002, pp. 219-228, doi: 10.1109/WPC.2002.1021343. (Year: 2002).*

International Search Report and Written Opinion dated Aug. 25, 2016 for International Application No. PCT/US2016/032225 filed on May 12, 2016.

* cited by examiner

600

Receive Raw Data — 605

Format/Reformat First Information — 610

Generate Feature Set — 615

Generate Model — 620

Generate Prediction — 625

SYSTEM, METHOD AND COMPUTER-ACCESSIBLE MEDIUM FOR MAKING A PREDICTION FROM MARKET DATA

CROSS REFERENCE TO RELATED APPLICATION(S)

This application relates to and claims priority from International Patent Application No. PCT/US2016/032225 filed on May 12, 2016, which relates to and claims priority from U.S. Patent Application No. 62/160,311, filed on May 12, 2015, the entire disclosures of which is are incorporated herein by reference.

FIELD OF THE DISCLOSURE

The present disclosure relates generally to hidden arbitrages, and more specifically, to exemplary embodiments of exemplary systems, methods and computer-accessible medium that can be used to predict hidden arbitrages inferred from market data.

BACKGROUND INFORMATION

It may be beneficial to provide an exemplary systems, methods and computer-accessible medium to predict hidden arbitrages inferred from market data, which can overcome some deficiencies present in current hidden arbitrages

SUMMARY OF EXEMPLARY EMBODIMENTS

An exemplary system, method and computer-accessible medium for generating a model(s), can include, for example, receiving first information related to raw data, generating second information by formatting the first information, generating third information related to a feature set(s) of the second information, generating the model(s) based on the second and third information. Fourth information related to a user-defined regularization of the second information can be received, fifth information can be generated based on a reformatting of the second information using the fourth information. A prediction(s) can be generated based on the model(s). The prediction(s) can be generated based on a time horizon(s).

In certain exemplary embodiments of the present disclosure, fourth information related to a potential information value for the second information can be determined based on the third information. The fourth information can be determined using a simple regression procedure(s) or a correlation analysis. The second information can include a plurality of discrete data columns, and a plurality of equations can be generated based on a plurality of combinations of a set of data columns of the data columns. The second information can include a plurality of discrete data columns, and fifth information related to how a first data column of the data columns can be linked with at least one further data column of the data columns can be determined In some exemplary embodiments of the present disclosure, the third information can be generated based on the second information. A score can be assigned to each set of the feature sets based on a correlation of each respective one of the feature sets to the prediction(s). A particular feature set can be selected based on the score. The model(s) can be generated using an islanding procedure based on the first information and the second information. The islanding procedure can include generating a plurality of subsets of the second information. The islanding procedure can further include assigning one or more species to each subset of the subsets. The one or more species can be assigned a score based on a performance of each subset. The performance can include a comparison of each subset relative to its historical performance.

The model(s) can be generated using a neural network(s). The neural network(s) can be an evolutionary neural network(s). The model can be a genomic model(s), and the evolutionary neural network(s) can be an evolutionary neural network(s) with a mutation(s) or a recombination(s). The mutation(s) or the recombination(s) can include a rate(s) that can be tunable using a hyperparameter(s).

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1A:
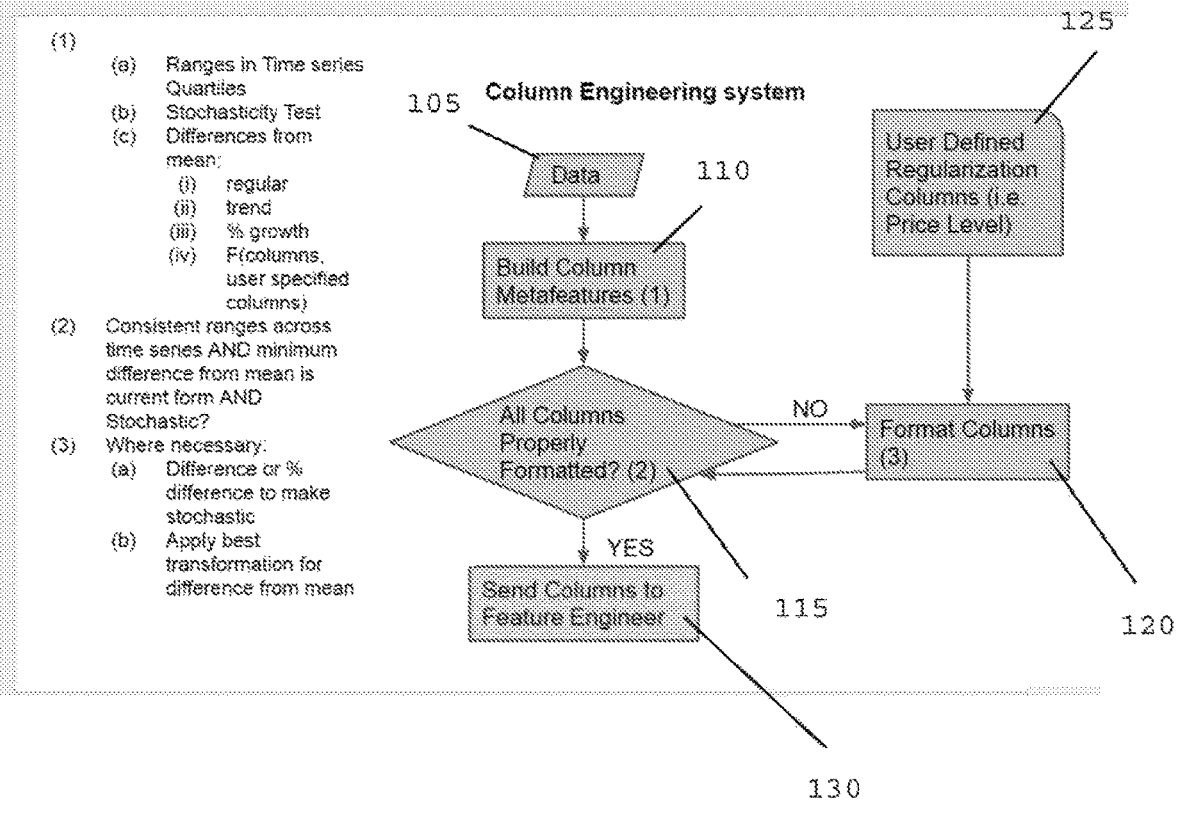
FIG. 1A is a flow diagram of an exemplary method for facilitating column engineering according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

According to an exemplary embodiment of the present disclosure, systems, methods and computer-accessible medium can be provided that can consistently and constantly evolve/improve with or without new data. This can be accomplished for preferred "targets" to predict, features to choose and/or variables to combine, manipulate and mutate. For example, such exemplary procedures can be performed as a feedback loop in motion.

The exemplary systems, methods and computer-accessible medium, according to an exemplary embodiment of the present disclosure, can utilize and find hidden arbitrage, as well as predict seamlessly on the unit level across all asset classes.

For example, according to an exemplary embodiment of the present disclosure, a price imputation procedure can be performed using previously whole asset transactions, along with the aggregate price paid. In this manner, the exemplary models, according to an exemplary embodiment, present disclosure, can deduce or otherwise determine the individual cost of an asset over time. Macro factors, geospecific factors and sector level factors can be weighed in conjunction and in an unstructured way with each individual asset. This can facilitate the exemplary systems, methods and computer-accessible medium to situate or otherwise determine why an asset can be priced a certain way, for example, by weighing all factors simultaneously, as well as how other types of collateral can fare in the same area, or with borrowers of a similar profile in different locations to determine the cause of why certain assets can be worth more than others. Using the exemplary systems, methods and computer-accessible medium, it is possible to dissect the elements of value and price.

As an example, in traditional models, finance companies can generally be forced—by technological limits—to pick and choose slices of data to draw upon. They may have to wait to see a drop of oil prices, as well as how collateral moves with it, before they can reactively adjust, (e.g., a local mortgage curve based on how this relationship has worked in the past and its vector of movement currently). Using the exemplary systems, methods and computer-accessible medium, according to the exemplary embodiment of the present disclosure, this methodology can be improved by facilitating companies to take into account unusual activity, such as, for example, a localized rise in personal credit extension or a drop in college loan curtailments, and compare such activity with certain exemplary factors, such as, for example, previous activity in the zip code, borrower behavior in other areas with similar loan/income profiles, and a wide variety of other macro condition. Thus, with such exemplary systems, methods and computer-accessible medium, it is possible to predict what that movement can mean.

For example, in the case of a drop in oil prices, persons in oil producing zip codes can be aware of the upcoming issues before they are even reflected in the price of oil, and they can start extending their credit or paying off their unsecured debts at slower paces to conserve cash. Indeed, because the exemplary systems, methods and computer-accessible medium according to the exemplary embodiment of the present disclosure, can weigh many factors, and can situate them in, for example, a zip, state, country or even international environment, it can be possible to view a wider future possibility in a way that can be difficult for humans. By understanding that people in the oil producing zip codes are conserving cash at higher rates than there similar counterparts in other geographies, and tying that same behavior to prior points in time where this was a leading indicator of a lowering oil price, it can be possible to make various important predictions. The following exemplary chart summarizes the exemplary flow diagram described above:

Cash Conservation→Geographically Lowering Oil Price-→Higher Default Rates in Asset Backed Credit.

This example shows one exemplary relationship, while people can review this specific exemplary instance, but may not be able to review an unbounded number of examples, along with the information provided from, for example, the Nasdaq on Silicon Valley zip codes to small sector based changes that can be detected when weighed at the zip level nationally (e.g., zip codes of a certain profile reacting more adversely to unemployment rates or interest rate fluctuations).

The application of this example can generally be associated with Autosecuritization. Traditional securitization simply takes the historical performance of assets, and projects them forward. The exemplary systems, methods and computer-accessible medium can facilitate a review of, for example, at least a portion of collateral, impute its fair current price, project its performance forward, then compute what the price in the future will be given using such performance. For example, by subtracting the fair current price from the projected future price, it can be possible to determine, for example, the most valuable assets (e.g., the assets most undervalued by the market today).

Provided below are further exemplary, and non-limiting, applications which can be used with exemplary embodiments of the present disclosure, where the accuracy and real time adjustments of the exemplary systems, methods and computer-accessible medium can be utilized, such as:

a. Maximizing loans highest potential net present value, for example, theoretical changes to the terms of debt to raise the forecast of lifetime value. Such information can include marginal interest rate adjustments or amortization extension, as well as a way to balance reductions to increase the duration of cash flows before default or prevent even it in some cases.

b. Reducing exposure to severe and even catastrophic risks (e.g., asset level reserve requirements, liquidity and leverage ratio suggestions).

c. Pricing asset sales, acquisitions, securitizations, loan products and insurance offerings more accurately and profitably.

d. Asset Allocation (e.g., when/if to acquire or dispose of assets, as well as the most beneficial types of loans and terms financial entities can be making efforts to originate).

The exemplary systems, methods and computer-accessible medium can be used to, for example, facilitate advanced data analysis platforms that start with unstructured data sets, utilize procedures to identify formats, organize and preprocess data before feeding it into various proprietary analysis and predictive systems, thus providing information upon which a person can act. With the exemplary systems, methods and computer-accessible medium, according to an exemplary embodiment of the present disclosure, it can be possible to predict and/or visualize hidden arbitrage in the markets, for example, in illiquid and credit-based assets.

The exemplary preprocessing software NOMAD can operate to streamline the preparation of data sets for analysis so subject matter experts can structure complex architectures, predicting any number of variables, with any number of data sets.

Once the operations for a project have been set up, its output can be fed to a partial state planner, which can generate a step-by-step plan to be reviewed by the user before it can conduct parallel import, join and manipulate (e.g., add columns, remove, reformat/merge dates and periods). The exemplary systems, methods and computer-accessible medium, according to an exemplary embodiment of the present disclosure, can generate new data to better represent the entire state space of the network for the current period and deep into the past (e.g., difference columns, average/min/max/median over multiple time periods). The exemplary systems, methods and computer-accessible medium can also provide a smart grouper/joiner which can combine data sets that may not have the exact same labels. This can be implemented via, for example, the exemplary systems, methods and computer-accessible medium's intelligent matching system. The exemplary planner can infer in what order the operations should be completed, and what operations may not be carried out on the same table at the same time.

The exemplary systems, methods and computer-accessible medium can fulfill a previously-unmet need as it can provide tools to manage complicated financial projects, which are usually not uniform, and need customization. In contrast, other conventional systems which were designed to look for specific columns have proven to be unusable. In practice, different assets utilize different micro classifications to provide a larger cash flow prediction. Such exemplary micro classifications can include, for example, features like different loan status recordings, rules for default, (e.g., for college loans there may be no recovery event for example), insurance proceedings and other features of similar nature. The data sets that these systems can be required to deal with can often be so big that without a procedural processing system, such as the one described below, it would be difficult and likely impossible to carry out a database "join" operation. In another exemplary embodiment, the exemplary system, when faced with the need to join a 6 billion row loan performance data set to a 4 billion row personal credit data set, accomplished this task with modest computational resources, while no other existing system could complete this action. By utilizing its automated pre-processor the exemplary systems, methods, and computer-accessible medium was able to decompose the join operation into many smaller and more feasible operations before recombining those lower level operations to complete the operations. It was estimated that the organization utilized for a team of people to mimic this procedure would be prohibitively slow and expensive.

The exemplary systems, methods and computer-accessible medium, according to an exemplary embodiment of the present disclosure, can label the number of computers/processors the platform has at its disposal in order that the exemplary systems, methods and computer-accessible medium's parallelization technology can queue the tasks off to the processors, one by one, until the architecture can be fully assembled. Working without interruption of the code, which has been previously vetted, the exemplary systems, methods and computer-accessible medium can continue to operate until it finishes the tasks in the fastest possible, time and with no errors introduced in processing.

After preprocessing, the exemplary systems, methods and computer-accessible medium can facilitate two important additional technologies that can produce the classifications as specified by the user. The first can be a technology aiming to be very accurate in efficiently tuning a procedure chooser, which can involve optimizing the hyper parameters. This exemplary technology can operate on the prepared data sets through open source libraries, and can integrate previously-known machine learning procedures (e.g., random forests, neural networks, Bayesian networks and support vector machines) with a new machine learning procedure that can incorporate artificial neural networks undergoing artificial evolution. The artificial neural networks can be flexible in selecting its depth (e.g., number of layers), and can balance the complexity by various regularization procedures. In the exemplary artificial evolutionary processes, various machine learning modules can organize themselves into groups of interdependent types to facilitate competition amongst the different types, while simultaneously optimizing towards the best construction by type. Thus, for example, the exemplary systems, methods, and computer-accessible medium, according to an exemplary embodiment of the present disclosure, can be configured to iteratively optimize the optimal number of hidden layers in a specific type of neural networks in this eco-system, or the connectivity of a Bayesian networks (e.g., number of parent and children nodes) or, in case of random forest, the number of variables, depth of the trees, the number of trees and the tree systems.

Exemplary Nomad Process

An exemplary multipurpose interface can be used to generate target output data within some target time-frame(s), with some target performance(s), as utilized by a user harnessing Artificial Intelligence ("AI") planning systems, machine learning, distributed computing, parallel computing and evolutionary programming. Beginning with some data set(s), some classification target(s) and some index(es) (e.g., either time series, geographic, demographic, or some project specific grouping), the exemplary systems, methods and computer-accessible medium can be used, for example:

1. Pre-analysis of data (e.g., correlation matrix, stochasticity, equation identification (column1=f(column2, column3)), by type of data distribution;
2. Initial feature engineering based on pre-analysis (e.g., only using single variables out of correlated groups, removing variables which can be functions of other variables, taking first and second moments);
3. Initial model generation Regression, Probabilistic Networks (e.g., Bayes (mt), Markov (mt), Neural Networks with multiple refinements (e.g., Convolutional, auto-encoded preprocessing, recurrent, evolutionary));
4. Initial Evaluation considering model complexity, training time, overfitting on a cross-validation set, project requirements, number of examples in dataset, amount missing data in dataset, bias in missing data in training set;
5. Proceeding and evaluating intelligently following in sequence or parallel depending on resources:
6. Increasing/Decreasing model complexity or training time on existing models and generate new models bearing in mind cross-validation overfitting and number of training examples;
7. Performing additional feature engineering by looking at what information to consider in the machine learning process, considering various moments and previous values of time series data in order of variable importance, swapping out correlated or formulaic variables.
8. Incorporating additional data sources either provided for project or from library joined by index considering the informational value of a source (e.g., data that can be joined by region and time can be more useful than data that can only be joined by period, etc.); and/or 9. Refining classification target, penalizing for number of models utilized to calculate and lower numbers of rows in certain subsets.

FIG. 1A shows a flow diagram of an exemplary column engineering diagram, according to an exemplary embodiment of the present disclosure, which can be performed by the exemplary systems, methods and computer-accessible medium. For example, at procedure 105, raw data can be provided, received and/or generated, and column metafeatures can be built at procedure 110. At procedure 115, a determination can be made if the columns can be properly formatted. If the columns are not properly formatted, then at procedure 120, the columns can be formatted using, for example, a user-defined regularization of the columns, which can be received and/or generated at procedure 125. If the columns are properly formatted at procedure 115, then, at procedure 130, the columns can be provided to the exemplary feature engineering system described below.

Figure 1B:
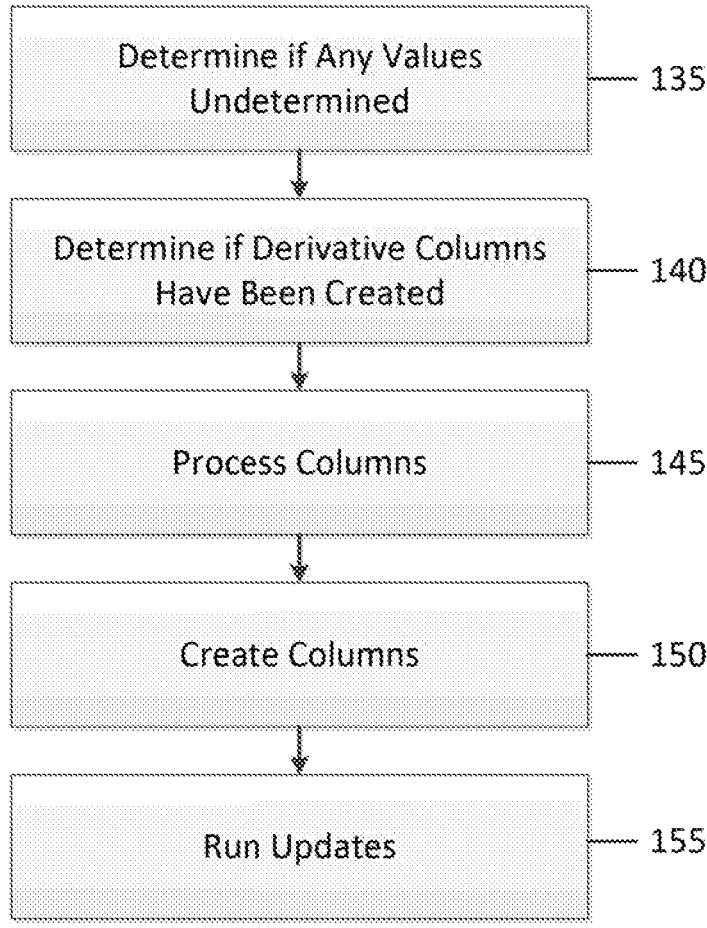
FIG. 1B is a further flow diagram of the exemplary method for facilitating column engineering according to another exemplary embodiment of the present disclosure.

FIG. 1B shows a further exemplary method for column engineering according to another exemplary embodiment of the present disclosure. For example, at procedure 135, the exemplary systems, methods and computer-accessible medium, according to an exemplary embodiment of the present disclosure, can determine if any of the following were previously not determined: (i) percent of missing data, (ii) percent of the data that has the same value, (iii) percent of the data that has a value=0, (iv) percent of data with a future value, (v) if the data stochastic over time (e.g., by comparing if values can be more highly correlated to trend line or past value), (vi) if the expected column value has moved over time, and/or (vii) if trend over time more closely resembles percentage growth or linear growth. At procedure 140, if a derivative column has not been created in a derivative table for each column, those columns can be sent for processing at procedure 145, along with any other columns that the user has specified should be created.

At procedure 150, user-specified column creation can be added to the update queue, combined with any other updates sharing a "where" statement to the list of updates to be run. If the table is not a time series, then the previously unprocessed columns can be processed in the following exemplary manner. If the column can be numeric, original values can be maintained in a "derivative table" (e.g., a table containing targets, features used in feature set engineering creation, any columns utilized to determine how to join other tables to this one, and any columns utilized to determine output, test, cv and training conditions). If the column can be a date, add the difference between this date column and every other date column to the derivative table while avoiding duplicates. If the data contains text, create binary columns (e.g., "CurrencyisUSD") for each value column with a frequency that can be greater than about 10%.

If the table is, or includes, a time series, then the previously unprocessed columns can be processed in the following exemplary manner. For example, if the column can be numeric, if previous value of column can explain more than 50% of current column value (e.g., R-squared from regression), and if the observed difference from linear trend line>observed difference from the percent growth trend line and less than about 2% of data=0, then add the percentage difference of the column between periods to derivative table. Otherwise, add the difference of the column between periods to the derivative table.

If a variance across periods for column for particular index is less than the variance across indexes for a particular period, then the exemplary systems, methods and computer-accessible medium, according to an exemplary embodiment of the present disclosure, can add any unformatted columns to a derivative table. Otherwise, the unformatted column can be added to the derivative table. Additionally, if it is not a derivative table, the following can be added: (i) seasonality binary variables (e.g., isMonth1 or isDayofWeek1) for the day of week, if daily, and for the month of year) and (ii) historical values/differences/percentage differences (e.g., selected using the above) for additional time periods for class value. Timer periods can include, e.g.: (i) daily data: 1, 7, 14, 28, 56, 112, 224, 365, 448, (ii) monthly data: 1, 3, 6, 9, 12, 18, 24, 36, 48, (iii) quarterly data: 1, 2, 4, 8, 12, 16, 20, and (iv) yearly data: 1, 2, 3, 4, 5, 6, 10.

If the column can be a date, then the exemplary systems, methods and computer-accessible medium can add the difference between this date column and every other date column while avoiding duplicates. If the data contains text, then binary columns can be created (e.g., "CurrencyisUSD") for each value where the column with a frequency greater than about 10%. At procedure 155, all updates can be run for each table that have been queuing during procedure 150, grouped by where the statements for faster execution can be located.

Figure 2A:
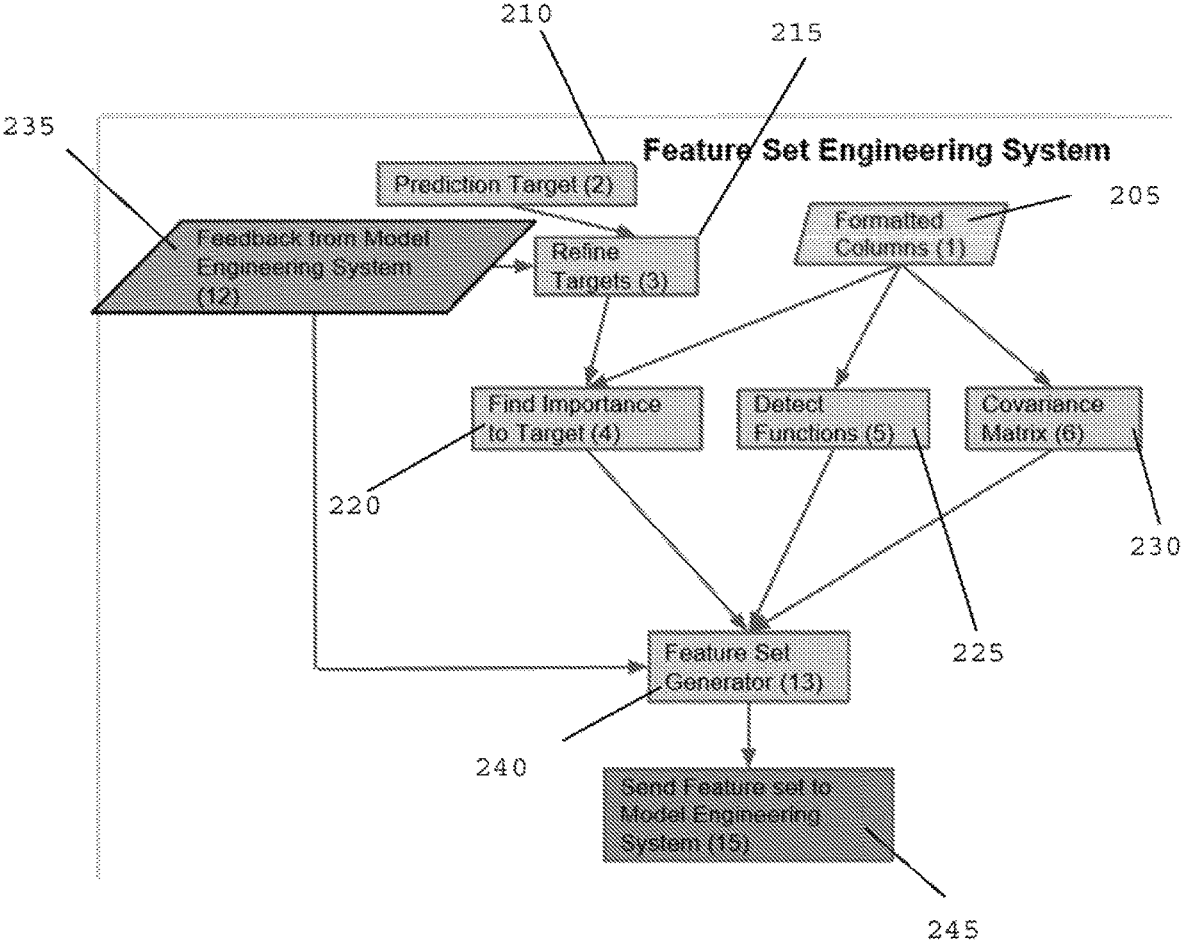
FIG. 2A is a flow diagram of an exemplary method for facilitating feature set engineering according to an exemplary embodiment of the present disclosure.

FIG. 2A illustrates a flow diagram of an exemplary method for facilitating feature set engineering, according to an exemplary embodiment of the present disclosure, which can be performed by the exemplary systems, methods and computer-accessible medium. For example, at procedure 205, columns can be preformatted, for example, by a column engineer. At procedure 210, a prediction of what is to be classified can be generated, and the classification target can be refined at procedure 215 considering different possible time horizons (e.g., mortgage current in 12 months vs. mortgage current in 6 m mortgage and current in 12 m given current in 6 m) and groupings (e.g., class 4 and 5 can be similar→combine classes for first classifier and build secondary classifier just for classes 4 and 5). At procedure 220, a simple regression, or other metric, can be used to determine the potential informational value of each column (e.g., the importance to the target), and at procedure 225, the exemplary systems, methods and computer-accessible medium can determine various mathematical equations in column sets, and prevent them from existing together in feature sets (e.g., Column a=f(column b, column c can often cause learning to fail). According to an exemplary embodiment of the present disclosure, using the exemplary systems, methods and computer-accessible medium, it can be possible to mutate the variables, for example, possibly p to quadratic equations for combinations of variables to determine whether it can be possible to improve the predictive power thereof.

Still referring to FIG. 2A, at procedure 230, the exemplary systems, methods and computer-accessible medium can determine how linked or non-linked the exemplary columns are. For example, columns that can be very similar can waste learning time and can cause the learning to fail. At procedure 235, a list of which columns and column sets have performed the best in the exemplary Column Engineering System above can be generated or received, and feature sets with high variable importance can be generated at procedure 240. For example, this can be performed for most or all utilized columns, many recommended columns, and/or no bad combinations of variables, or on low covariance columns within the exemplary feature set. The exemplary feature set generator can also check to make sure that including certain columns with biased missing values does not highly skew the class distribution, and the distributions of the other column values in the feature set. If this can be the case, it can generate multiple linked feature sets that can build separate models to be used in tandem for different subspaces of the overall problem space. At procedure 245, the generated feature set can be provided to the exemplary model engineering system below.

Figure 2B:
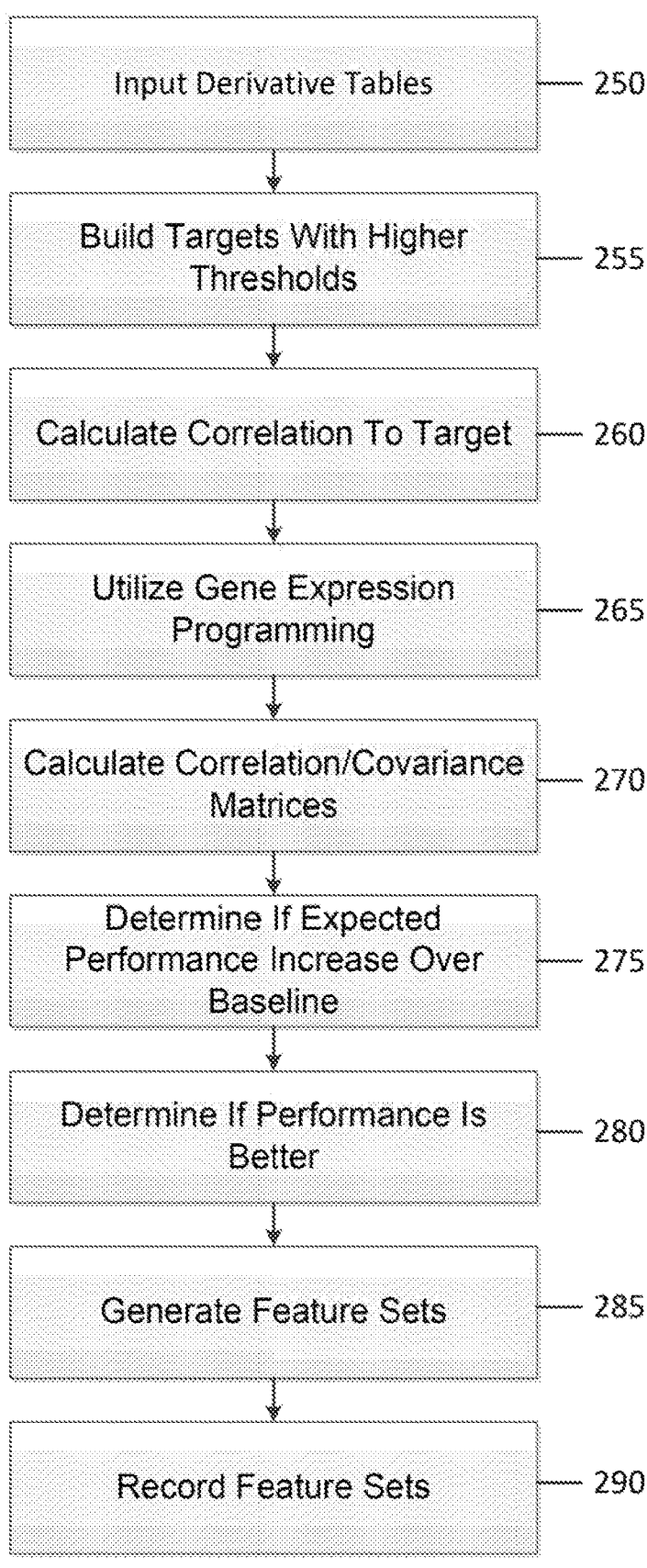
FIG. 2B is a flow diagram of the exemplary method for facilitating feature set engineering according to another exemplary embodiment of the present disclosure.

FIG. 2B illustrates a flow diagram of a further an exemplary method for facilitating feature set engineering, according to an exemplary embodiment of the present disclosure. For example, at procedure 250, information contained in "derivative tables" (e.g., the derivative tables described above) can be received. If performance is better than the user requirements, then at procedure 255, the exemplary systems, methods and computer-accessible medium, according to an exemplary embodiment of the present disclosure, can try to build targets with higher thresholds and different durations. At procedure 260, the correlation to target can be calculated for all potential features as well as the percentage null and the percentage the same in the presence of a target value, if not calculated. A Gene Expression Programming can be utilized at procedure 265 to find equations (e.g., with the learning of constants) to find combinations of variables which should not be used together in feature sets since sets of variables being present that can be direct equations of each other can affect the machine learning procedure. At procedure 270, the correlation/covariance can be calculated for matrices between all potential features, if not already calculated. The expected performance increase over baseline models with this feature present can be determined at procedure 275. At procedure 280, if the performance can be better than the user requirements, then the exemplary systems, methods and computer-accessible medium can generate Feature Sets at procedure 285.

For example, the exemplary systems, methods and computer-accessible medium, according to an exemplary embodiment of the present disclosure, can generate feature sets by generating prejoined sample tables for testing, training, cross validation and output sets, if none exist, which can speed up the feature set creation. For the Feature Set creation, the following exemplary parameters can be used:

The Initial Column score=((correlation to target)+(Expected performance increase over baseline)*(0.1{*}))

Initial Column score=Initial Column score*((1{*})*percentage not null in presence of target in output set)

Initial Column score=Initial Column score*(1−((0.75{*}) *percentage same in presence of target in output set))

Initial Column score=Initial Column score*(1−((0.75{*}) *percentage same in presence of target in output set))

If feature is used in less than 4 models:

Initial Column score=Initial Column score*(5−number of models used in)

Loop until more than 6 columns with about 10% chance of stopping each iteration.

The exemplary systems, methods and computer-accessible medium, according to an exemplary embodiment of the present disclosure, can randomly select a column to add to the feature set with a particular probability (e.g., column score/sum(all column scores)) and can reduce the selected column score to about 0, as well as reduce other column scores. For example, the New Column score=Column score*(1−((correlation between selected column and this column)/5{*})). If the number of columns selected that can be invariant for output set in feature set exceeds about 60%{*} of the number of columns in feature set, only select among columns that aren't all the same in output conditions for target. At procedure 290, The Feature set can be recorded, and data files containing training data and cross validation data for the target and the feature set can be created to facilitate better parallelization.

Figure 3A:
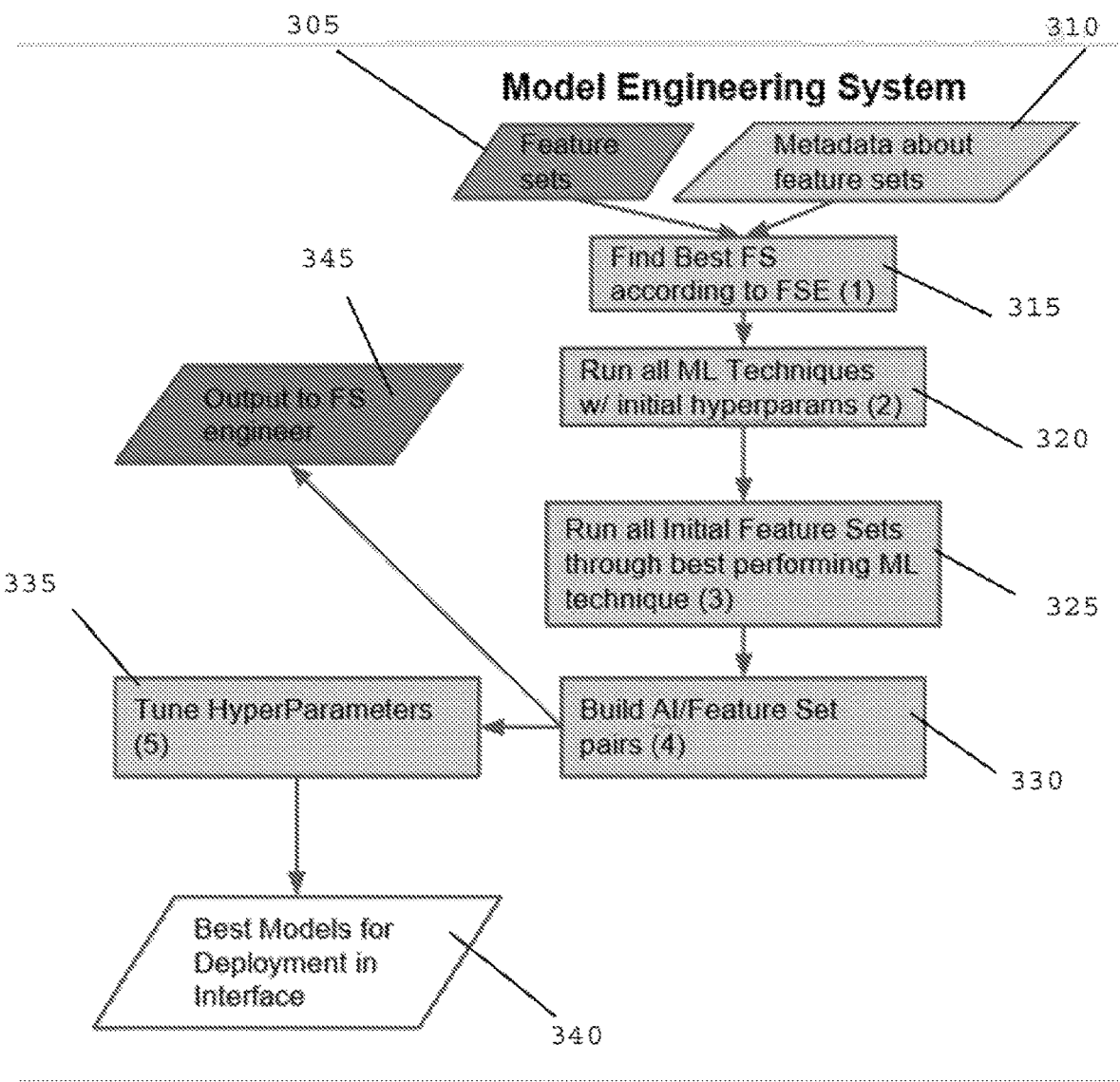
FIG. 3A is a flow diagram of an exemplary method for facilitating model engineering according to an exemplary embodiment of the present disclosure.

FIG. 3A shows a flow diagram of an exemplary method for generating a model engineering system according to an exemplary embodiment of the present disclosure, which can be performed by the exemplary systems, methods and computer-accessible medium. For example, at procedure 305, the feature set generated above can be received. In addition, metadata about the features sets can be received at procedure 310. At procedure 315, the exemplary systems, methods and computer-accessible medium, according to an exemplary embodiment of the present disclosure, can utilize the exemplary Feature Set Engineering system to score the feature sets based on a correlation to the target, a correlation with each other, a number of variables, a number of rows completely filled, a systemic biases in missing data, and various other parameters. At procedure 320, the exemplary systems, methods and computer-accessible medium can evaluate many or all AI techniques from various libraries remove on the best feature set according to feature set engineering system, then at procedure 325, it can evaluate all feature sets generated from feature set engineering through a best performing AI procedure.

Still referring to FIG. 3A, the exemplary systems, methods and computer-accessible medium, according to an exemplary embodiment of the present disclosure, at procedure 330, can use data on the AI technique performance and feature set performance data to start building AIs using an exemplary high performing feature sets and exemplary techniques. This information about the performance of certain variables and variable combinations can be provided to the feature set engineering system to generate better feature sets, and to refine the forecasting time horizons, or it can be provided to a feature set engineer at procedure 345. At procedure 335, the exemplary systems, methods and computer-accessible medium can tune the hyperparameters of the best performing AI type and Feature Set pairs. AIs can have hyperparameters designed for quicker execution than what can be facilitated in order to build up data about which AI types and feature sets can be likely to result in the highest performing models. Then, the best or beneficial exemplary models for deployment can be selected at procedure 340.

Figure 3B:
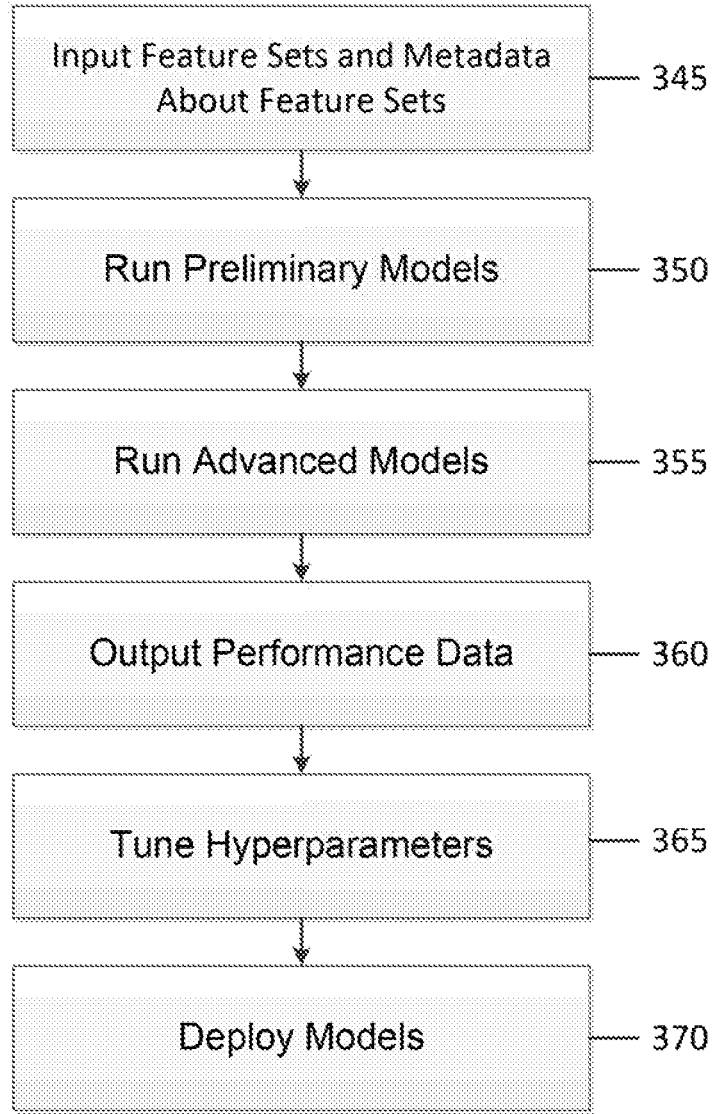
FIG. 3B is a further flow diagram of the exemplary method for facilitating model engineering according to another exemplary embodiment of the present disclosure.

FIG. 3B shows a flow diagram of a further exemplary method for facilitating model engineering according to an exemplary embodiment of the present disclosure. For example, at procedure 345, Feature Sets and metadata about the Feature Sets can be received. At procedure 350, preliminary models can be run, which can include running all feature sets through an exemplary Regression and Random Forest machine learning procedure to get a baseline performance. At procedure 355, advanced models can be run, which can include running the best performing (e.g., highest average "lift" (e.g., performance of model above dominant class guessing) 15% of feature sets through additional random forest learning to generate additional models. If the feature set can be used on more than 50% of output rows, facilitate this to run 3 times. If the if feature set can be used on more than 80% of output rows, facilitate this to be run 5 times. If the feature set can be used on more than 97% of output rows, facilitate this 10 or more times.

The best performing (e.g., highest average "lift" (e.g., performance of model above dominant class guessing)) 15% of feature sets can be run through additional support vector machine learning to generate additional models once per feature set. The best performing (e.g., highest average "lift" (e.g., performance of model above dominant class guessing)) 15% of feature sets can be run through additional neural network learning to generate additional models. If the feature set can be used on more than 50% of output rows, facilitate this to be run 3 times. If the feature set can be used on more than 80% of output rows, facilitate this to be run 5 times. If the feature set can be used on more than 97% of output rows, facilitate this to be run any number of times. The best performing (e.g., highest average "lift" (e.g., performance of model above dominant class guessing)) 15% of feature sets can be run through additional evolutionary neural network learning to generate additional models. If the feature set can be used on more than 50% of output rows, this can be run 3 times. If the feature set can be used on more than 80% of output rows, facilitate this to be run 5 times. If the feature set can be used on more than 97% of output rows, facilitate this to be run any number of times. Additionally, the best performing (e.g., highest average "lift" (e.g., performance of model above dominant class guessing)) 15% of feature sets can be run through additional Bayes Net learning to generate additional models once per feature set.

At procedure 360, performance data can be outputted, which can include recording the average "lift" to be used in feature set engineering in subsequent rounds. For the best evolutionary neural networks and neural networks (e.g., the best 2 evolutionary neural networks and neural networks), a Bayesian optimization procedure can be used at procedure 365 to tune hyperparameters. At procedure 370, the exemplary systems, methods and computer-accessible medium, according to an exemplary embodiment of the present disclosure, can use Bayesian optimization to determine which set of models can be most likely to result in highest forecasting performance based on an exemplary cross validation set, and then evaluate that set of models on a test set to determine the likely performance, and use this on an output set to generate final predictions.

Exemplary Evolutionary Artificial Intelligence

Many traditional AI systems, particularly network-based systems often have learned parameters and fixed architectures. "Learning" the best architecture for a network can be extremely time-consuming to the point where it may not be feasible. Using a technique called "drop out", scientists have been able to reduce overfitting by removing nodes and edges periodically and bringing them back. The exemplary systems, methods and computer-accessible medium, according to an exemplary embodiment of the present disclosure, can facilitate features, nodes and/or edges to be added or removed in a random or semi-random fashion (e.g., based on the exemplary variable gene mutation rates, genes that have been tried and failed can be less likely to mutate). This can facilitate models of variable complexity and can increase the size of the state space to be explored.

The exemplary systems, methods and computer-accessible medium can use methodology and/or procedures that can be similar to expression. For example, nodes and edges can be pretrained to be potentially useful features, but can all add to resource consumption and can have a tendency to overfit. Evaluating individuals on a cross validation set can prevent a race to complexity, and overfitting through additional penalties on complexity can also be applied. This process can be used for feature engineering in that a large potential feature set can be initially "off" can be mutated "on" and have an effect on the network.

Figure 4:
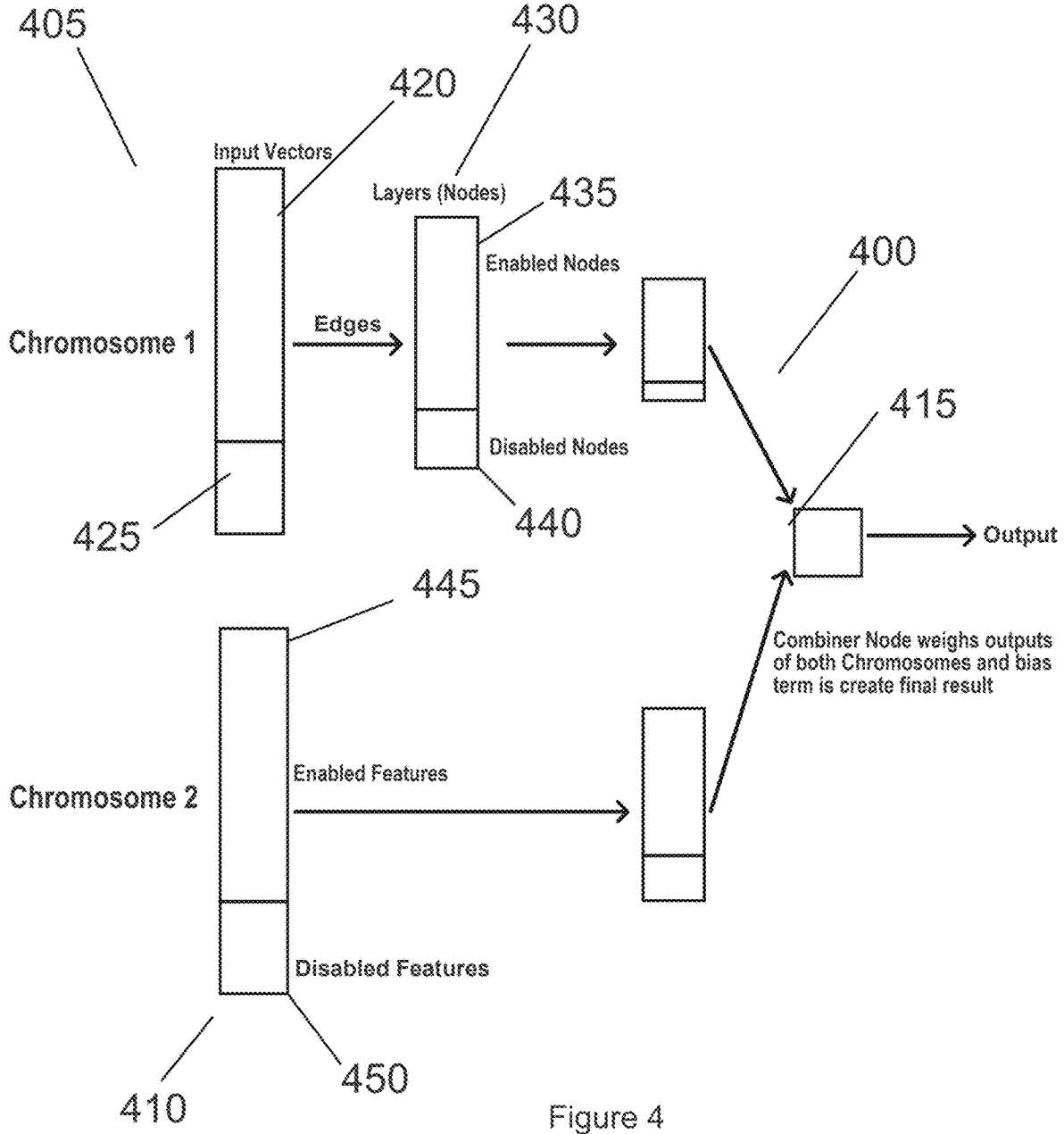
FIG. 4 is an exemplary diagram illustrating a genetic mutation according to an exemplary embodiment of the present disclosure.

To facilitate certain genetic operations, a multi chromosomal model 400 can be used. (See e.g., FIG. 4). Multiple networks (e.g., networks 405 and 540) can be merged (e.g., procedure 415) immediately before classification to facilitate sections of the exemplary networks to be exchanged with each other in potentially useful ways. For example, as shown in the diagram of FIG. 4, network 405 can include a plurality of input vectors 420, and a plurality of disabled input vectors 425. Edges from the input vectors 420 can be grouped into layer 430 (e.g. nodes), which can include enables nodes 435 and disabled nodes 440. Network 405 can then be merged with network 410. Network 410 can include enabled features 445 and disabled features 450. The enabled features can be merged with network 405. This can facilitate, for example: (i) recombination—swapping of chromosomes, (ii) merging—combining individuals together and (iii) splitting—making individuals out of single chromosomes Exemplary Database Management and Planning Systems The exemplary systems, methods, and computer-accessible medium, according to an exemplary embodiment of the present disclosure, can be designed to run on top of existing relational database systems, keeping data separated by index, and using views to generate feature sets for machine learning, except in instances where using a view can cause complicated time consuming references to multiple tables, or that require multi row calculations and can be used multiple times (e.g., test with view, create row if successful).

Many database operations can utilize a number of complex sub operations which can be done with particular dependencies on other sub operations (e.g., create columns before filling them with data, indexing before joins or complex operations, etc.). An exemplary AI planning system can be used to manage these many complex sub operations without requiring user involvement, while parallelizing operations to the greatest extent allowable by the nature of the operations and the hardware available.

Exemplary User Specified Suggestions (a Priori Knowledge of Space)

For example, fitness selection can be used to govern the evolutionary systems. There can be multiple different scoring procedures, which can be used and calibrated as part of the Nomad Process including Akaike information criterion, Bayesian information criterion, Mean squared error and/or Absolute error. Elitism, preserving some number of the best individuals without applying genetic strategies between generations, can be used to maintain performance levels during the evolutionary process.

Speciation, creating multiple individuals who can be assigned to fitness selection groups, can be used for a boosting effect that can enhance performance by combining the outputs of multiple individuals and to exploiting possible divisions in the state space. This can be referred to as "Islanding."

Exemplary Neural Networks

The exemplary systems, methods and computer-accessible medium, according to an exemplary embodiment of the present disclosure, can initialize evolutionary neural networks by creating a population of bi-chromosomal neural networks (e.g., which can normally be two separate neural networks whose results can be combined and weighted at the end). Networks can be given a binary genome for each chromosome, reflecting whether each node and its corresponding edges can be enabled or disabled. The best performing individual can be maintained, assigned a 2r (e.g., r can be hyperparameter) individual for recombination, and 2 m (e.g., m can be a hyperparameter) can be assigned individuals for split/merge, and the remaining individuals can be mutated. Two chromosomes can be swapped between two multichromosomal evolutionary neural networks. A split can separate a multichromosomal evolutionary neural network into two evolutionary neural networks, each having a distinct subset of the chromosomes from the original evolutionary neural network. Either one gene can be flipped on, one gene can be flipped off, or one gene can be flipped on and one gene can be flipped off. The evolutionary neural network can be trained using an exemplary neural network training system (e.g., back propagation procedure). The best evolutionary neural network in a population can be maintained, but a sample for remaining members of population can be performed based on, for example, (cross validation accuracy–(min(cv accuracy for population) or dominant class guessing accuracy if higher))

Exemplary Islanding Process

Islanding is a system in which the dataset can be split up (e.g., using Self-organizing maps or another clustering system) without regard to class variable (or any future values) in order to model systems which behave differently in different regions of a dataspace. Building one model that can forecast mortgages for all houses in the country might be intractable, whereas building different models for different kinds of homes and mortgage holders can be easier. Systems with islanding can perform either better, or as well as, systems without islanding (e.g., at increased computational cost and with the condition that no islands can be created with fewer than sample size rows to prevent overfitting) because a system without islanding can be thought of as a special case of islanding where there may only be one island, and the machine learning/evolutionary problem may not specialize in as many regions of the data. During the evolutionary neural network generation process, multiple "species" (e.g., groups of evolutionary neural networks who compete exclusively with each other through the fitness selection process) can be generated and then the performance can be evaluated on each island. ⅓ of the species can be assigned to each island based on the performance, and then each population/island pair can undergo the same process until they have had ⅓ the number of generations of specific island learning/evolution as they have had on the full set.

The exemplary systems, methods and computer-accessible medium, according to an exemplary embodiment of the present disclosure, can train multiple populations in species (e.g., groups that can be competing in the fitness selection process against one another) of evolving neural networks on samples of the entire dataset. For example, the exemplary dataset can be divided up using some unstructured learning procedure, such as self-organizing maps or some other clustering procedure, ensuring that there can be a sufficient number of examples in each subset to facilitate the machine learning process. Multiple species can be assigned to each subset (e.g., "island") based on performance on that subset. The evolutionary neural network learning process can continue on the species-island level for the assigned species island pairs. How assets can perform relative to their recent and historical performance can be shown. An alert feature showing when assets can be due to change their return profile from what the market has traditionally come to expect from them.

Scenario analysis of macro changes on populations or pools can be performed (e.g., "Change the average interest rate of all these loans and see how the future projections change," and/or "Change forward market rate to input hypothesis"). This can facilitate a money manager to take a large hypothesis like a strong inclination as to where the S&P or Interest rates can be going and it can facilitate them to know exactly how to leverage that information across different asset classes because the way it can impact any asset in the exemplary system can be quantified. Whether it can be college loans, mortgage insurance or corporate loans, the exemplary systems, methods and computer-accessible medium can re-project, at the loan level, and can aggregate it up to any pool or financial instrument. The users can also take smaller hypotheses, and use them to govern their asset acquisition strategy (e.g., a theory that delinquent loans in California will perform 50% better in the next 6 months than the last 6th months). Not only can the users verify that the exemplary platform agrees with their instinct, but the exemplary systems, methods and computer-accessible medium can then be used to determine the best group of assets to acquire to properly capitalize on the information.

The exemplary systems, methods and computer-accessible medium, according to an exemplary embodiment of the present disclosure, can facilitate a project loan performance from pools using summary stats alone, sampling from existing owned or analyzed pools of assets with replacement until it constructs a pool to match the assets (e.g., if the average interest rate of a data sample that may already be possessed, but the prospective acquisition in the exemplary systems, methods and computer-accessible medium can provide a higher probability of lower interest rate loans being picked to formulate its projections). This can be performed, for example, thousands of times to ensure that it can create many different instantiations of the data set, and can minimize the damage from pool construction tactics like barbelling.

After an asset class can be mapped, a system can be operationalized, which any group of assets for that type can simply be loaded into the exemplary system and not only have their return profile forecasted quickly, but also be able to place a bid fit to a certain return. The exemplary systems, methods and computer-accessible medium can create liquidity in the markets, and can modulate deal flow for whoever utilizes it, because a simple web front end can be set up in which any seller of assets can quickly have a bid placed on all types of assets and even pools can be made up of many different kinds of assets without having to hire a firm and/or go through a long bidding/selling process.

For example, leveraging the exemplary microanalysis, a broker-dealer system can be generated for micro options that every day people can use and understand. Embedded in the exemplary asset class models can be forecasts for real estate in a certain zip code, or college loan performance for a certain age. Thus, the exemplary systems, methods and computer-accessible medium can act in the same or similar way as a casino, and use the exemplary prediction as a base to generate any of these new "indices", then simply try to create equal demand for both sides of the trade by using AI to move the index in a fashion that would maximize purchases.

The exemplary systems, methods and computer-accessible medium can find arbitrage by comparing this wide array of variables and making simple relative net present value calculations, evaluating their future predicted cash flows vs. the price they can be trading at, the duration of the assets lives as well as the capital commitment utilized to make the trade. The exemplary systems, methods, and computer-accessible medium can cast the widest net possible to bring to the surface both the best investment verticals to invest in, as well as "diamonds in the rough", from certain pools of assets that, despite existing in a sector experiencing less relative return, they can be trading at a huge discount relative to the cash the assets can produce over time. The exemplary systems, methods and computer-accessible medium can compare even the most exotic assets amongst each other, securities trades vs. whole asset trades vs. insurance deals in an easy side by side view that will make the best value for a funds dollars extremely transparent and easy to read. The system can also work by reverse inquiry (e.g., I'm looking for assets with this X return that will be retired in Y amount of time).

Exemplary Advanced Data Processing and Predictive Procedures to Find Hidden Arbitrage in the Markets, Specializing in Illiquid and Credit Based Assets The exemplary systems, methods and computer-accessible medium can utilize an analysis platform that can start with unstructured data sets, utilize procedures to identify formats, organize and preprocess data before feeding it into various proprietary analysis systems.

The exemplary preprocessing software can be used to streamline the preparation of data sets for analysis such that subject matter experts can structure complex architectures by predicting any number of variables, with any number of data sets.

Once the operations for a project have been set up, the exemplary partial state planner can generate a step-by-step plan to be reviewed by the user before it can conduct in symphony, an import, a join, or a manipulate (e.g., add columns, remove, reformat/merge dates and periods) the exemplary systems, methods, and computer-accessible medium can create new data to better represent the entire state space of the network for the current period and deep into the past (e.g., difference columns, average/min/max/median over x, y, z time periods). There can also be a smart grouper/joiner which can combine data sets that do not have the exact same labels through the exemplary intelligent matching system. The planner knows in what order the operations need to completed, and what operations cannot be done on the same table at the same time.

After preprocessing, there can be two or more technologies that can produce the classifications specified. The first technology can be, or can include, a system designed to be very accurate, and run extremely quickly (e.g., the exemplary procedure chooser/hyper parameter tuner). This technology can run the prepared data sets through open source libraries, and different kinds of random forests, neural networks, Bayesian networks and support vector machines, not only creating a massive champion challenger competition amongst the different types, and also can optimize towards the best construction by type (e.g., the optimal number of layers in the neural networks, the connectivity of a Bayesian networks, for example, number of parent and children nodes and for random forest number of variables, depth of the trees, number of trees and tree systems).

The exemplary second technology can be, or can include, an analysis system than can include a deep learning system that can be referred to as gene expression neural networks. This can take longer than the exemplary fast system, but it can be designed to reach a higher maximum accuracy, and can harness GPU programming to do so. The exemplary systems, methods and computer-accessible medium can have the freedom to form many smaller neural nets that can vote or "boost" all the way up to much larger ones, dictated by how well they maximize the classification accuracy. Because the exemplary system can be so advanced, it can use one large neural network for one part of the classification problem.

For example, self-organizing maps can be used to determine which parts of the data set should be divided in order to have certain procedures specialized to solve. For example, in relation to college loans, there are many different statuses including: a person can be in school, current with their payment, late with their payment, in the military, in the Peace Corps, there were different kinds of modified payments, or default. Since there may be no termination event for defaults, a borrower could go to or from any of these statuses. Thus, exemplary AIs can be built to determine what status each borrower would be in, AIs for how long they would be in each status when they landed there and then where they would be when they got out. Since some people pay over the utilized payment arbitrarily, AIs can also be built for the exact amount someone would pay any month. This can serve to make further use of the examples above in that for each of these classification problems the exemplary system could choose to use similar procedure constructions or vastly different ones, whatever maximizes the accuracy.

The exemplary systems, methods and computer-accessible system, according to an exemplary embodiment of the present disclosure, can also facilitate the exemplary technology to change rapidly with the times. For example, adding new data sets or types of data to the a given classification can be as simple as importing/labeling the new data to be included in a certain project, without having to change or tear down anything that was built already. According to an exemplary embodiment of the present disclosure, when further exemplary procedures are provided, or there are tweaks to the old ones, it can be easy to add them to the exemplary "champion challenger list" and the next time the exemplary system runs, it can be operationalized as if it has the highest accuracy for a classification or micro classification. This can facilitate the insulation of clients from obsolescence at an extremely low cost.

The exemplary systems, methods and computer-accessible medium, according to an exemplary embodiment of the present disclosure, can be used to correct the biggest shortcoming of machine learning, while machine learning can be very accurate by essentially smoothing distributions, it can have trouble noticing the difference between systemic changes and outliers. Instead of looking at a finite amount of examples, the exemplary systems, methods and computer-accessible medium can go through any number generations of evolution and training that it can build "dormant analysis DNA" which can distinguish between results that should be ignored and those that can be the start of a much larger change.

Exemplary Predictive Financial Analytics

Display of important variables and options can be used to alter them to see how it can impact the probabilities of default/prepayment that make up precise cash flow projections (e.g., as well as the cash flows themselves). This task can be carried out on the loan level, or sliced in groups by filters or entire populations of assets. Variables, such as, for example, gross coupon, time to maturity, current status, etc., can be changed on the loan or pool level, and then macro variables like money supply, consumer confidence or a bond index can be changed for large groups of assets to quantify large systemic changes.

How assets can perform relative to their recent and historical performance can be shown. An alert feature can be set up which can show when assets can be due to change their return profile from what the market has traditionally come to expect from them.

The exemplary systems, methods and computer-accessible medium can be utilized and/or controlled as follows: "Change the average interest rate of all these loans and see how the future projections change," or "Change forward market rate to input hypothesis." Such counterfactual analysis can facilitate a money manager to better understand a complex hypothesis, as in a hypothesis involving "a strong inclination as to where the S&P or Interest rates can be going." Such exemplary analysis can also facilitate knowledge of exactly how to leverage that information across different asset classes, because the exemplary system can quantify the way it can impact any asset in a manager's financial system. Whether it can be college loans, mortgage insurance or corporate loans, the exemplary systems, methods and computer-accessible medium can re-project at the loan level, and can aggregate up to any pool or financial instrument. The users can also take simpler hypotheses and use them to govern their asset acquisition strategy. For example, analyzing a hypothesis that delinquent loans in California will perform 50% better in the next 6 months than the final 6th month. Thus, not only can one verify that the exemplary systems, methods, and computer-accessible medium agrees with their instinct, but the exemplary system can then be used to determine the best group of assets to acquire in order to properly capitalize on the information.

The exemplary systems, methods and computer-accessible medium, according to an exemplary embodiment of the present disclosure, can project loan performance from pools using summary stats alone, sampling from existing owned or analyzed pools of assets with replacement until it can construct a pool to match the summary statistics of prospective assets. The exemplary systems, methods and computer-accessible medium can execute this many times to make sure it can create many different instantiations of the data set and thus minimize the damage from pool construction tactics like barbelling, where the portfolio can consist only of short- and long-term loans.

After the exemplary systems, methods and computer-accessible medium can map out an asset class, a manager can operationalize a system in which any group of assets for that type can simply be loaded into the system and not only have their return profile forecasted quickly but also be able to place a bid fit to a certain return. Eventually, the exemplary systems, methods and computer-accessible medium can generate data to stimulate and/or cause liquidity in the markets, as well as deal flow for whoever utilizes it. Moreover, because a simple web front end can be utilized, in which any seller of assets can quickly have a bid placed on all types of assets and even heterogeneous pools of assets, it is possible to obviate the need to hire a firm and/or go through a long bidding/selling process.

Exemplary Intake System: the exemplary systems, methods and computer-accessible medium, according to an exemplary embodiment of the present disclosure, can acquire (e.g., using APIs and importing from flat files by either scripting downloads/queries or web scraping) and pre-preprocess data (e.g., indexing, datatype assigning) into row level form (e.g., in MySQL, Hadoop, or other DB system) which can be used by the exemplary systems, methods and computer-accessible medium.

Exemplary Re-Intake System: the exemplary systems, methods and computer-accessible medium, according to an exemplary embodiment of the present disclosure, can append existing data when new information arrives (e.g., flat files) and/or can be available for query (e.g., an API), update datasets and derivatives as appropriate, and run statistical analysis (e.g., breakpoint analysis, difference in correlation, difference in range, etc.) to determine if forecast reevaluation can be utilized. To the extent that the system of data can be maintained relatively uniform, only those features, feature sets and models that are already performing at a high accuracy can be trained at higher rates. In the background, deeper models with wider coverage and diverse features can be attempted to be used in conjunction with the proven models; the larger the delta in expected forward accuracy the more the system will weigh out the "opinion" of those exotic models. For example, if the average top 5 model for 35 days and 10% can be 1.8% lift, but this month it's 0.4% lift, and the 2 and 3 month models with deep evolutionary neural networks can typically be 1% lift but are averaging 4% the deeper evolutionary neural networks can get more weight in the stocks and trades they recommend.

Exemplary Trading System: the exemplary systems, methods and computer-accessible medium, according to an exemplary embodiment of the present disclosure, can integrate models and their history with an exemplary trading platform to execute trades either autonomously or on the orders of supervisor. Exemplary trading systems can buy/sell securities based on the aggregation of Metadata that can be generated historically based on potential buys and sales, options and other derivatives, including hedging stock, bond or commodities indices, at different time horizons to build analysis genome for stocks, industries and indices. The computer-accessible medium can generate a genome of potential trades it could have made, factoring in conditions like performance of stocks in certain industries given macroeconomic numbers (e.g., rates, international indexes, commodities) and the deltas in those numbers at time t, t–1, t–6. This genome can dictate what models and combinations of models can be best to employ for a stock, or any kind of grouping of stocks to rank trades and dictate the holding period.

Exemplary Ensembling AI: The exemplary systems, methods and computer-accessible medium, according to an exemplary embodiment of the present disclosure, can use Bayesian and genetic systems (e.g., fitness selection with a genomic model of model sets to optimize through mutation, IS, and other genetic operators) to optimize both which models to use and determine how much computational resources to devote to large populations of evolutionary neural networks in order to solve the toughest forecasting challenges dictated by the sets of models producing the lowest amounts of lift relative to their performance going backwards. Situational ensembling of models can be added based on seasonality; dictating how best to aggregate and apply the metadata to pick the best models and ensembles of models to maximize ROI.

Exemplary Target Refinement System: from certain initial evaluation state, the exemplary systems, methods and computer-accessible medium, according to an exemplary embodiment of the present disclosure, can determine if thresholds and the duration of the forecast can be adjusted to find higher returns in shorter time periods with the objective of maximizing return in the minimum amount of time. Extreme thresholds (e.g., are there stocks that can reliably ensemble predictions over time that can be 200% in a year?) can be tested. This can facilitate the exploration of an almost infinite state space of profitability, where targets can be analyzed for 7 days 5, 10, 15, 20, 25, 100% or 8, 15, 93 or 207 days for all those same numbers. By running millions of models, the exemplary systems, methods and computer-accessible medium may not only determine what models to apply, but also the best models to build based on what it has learned about the relationship to macro data, industry data and what targets can be expected to perform the highest and result in the best trades given those conditions.

Exemplary Pipeline Construction: The exemplary systems, methods and computer-accessible medium, according to an exemplary embodiment of the present disclosure, can be used to determine if better forecasts for difficult problems can be constructed with intermediate forecasts of simpler problems. For example:

sales→earnings→stock price

Expenses→stock price

In addition to "Islanding", or chunking the data, the exemplary systems, methods and computer-accessible medium, according to an exemplary embodiment of the present disclosure, can also "island" the problem, facilitating the exploration and optimization of the widest possible solution set. Thus, the exemplary systems, methods and computer-accessible medium can aggregate the information in those models for the maximum ROI in trading, and forecast intermediate values (e.g., sales, costs or earnings estimates or even if the company will hit or miss analyst expectations and amount of expected variance). These exemplary models and targets can be combined to evaluate ultimately what the most accurate combinations of models and metadata will result in best trades.

Exemplary Portfolio Management System: The exemplary systems, methods and computer-accessible medium, according to an exemplary embodiment of the present disclosure, can maximize return and minimize specific risk across assets and asset classes seeking to manage to a negative VAR. NLP and web crawling can be used to widen the explanatory variables everything from newspapers to mergers and acquisition publications to company conference calls.

Figure 5:
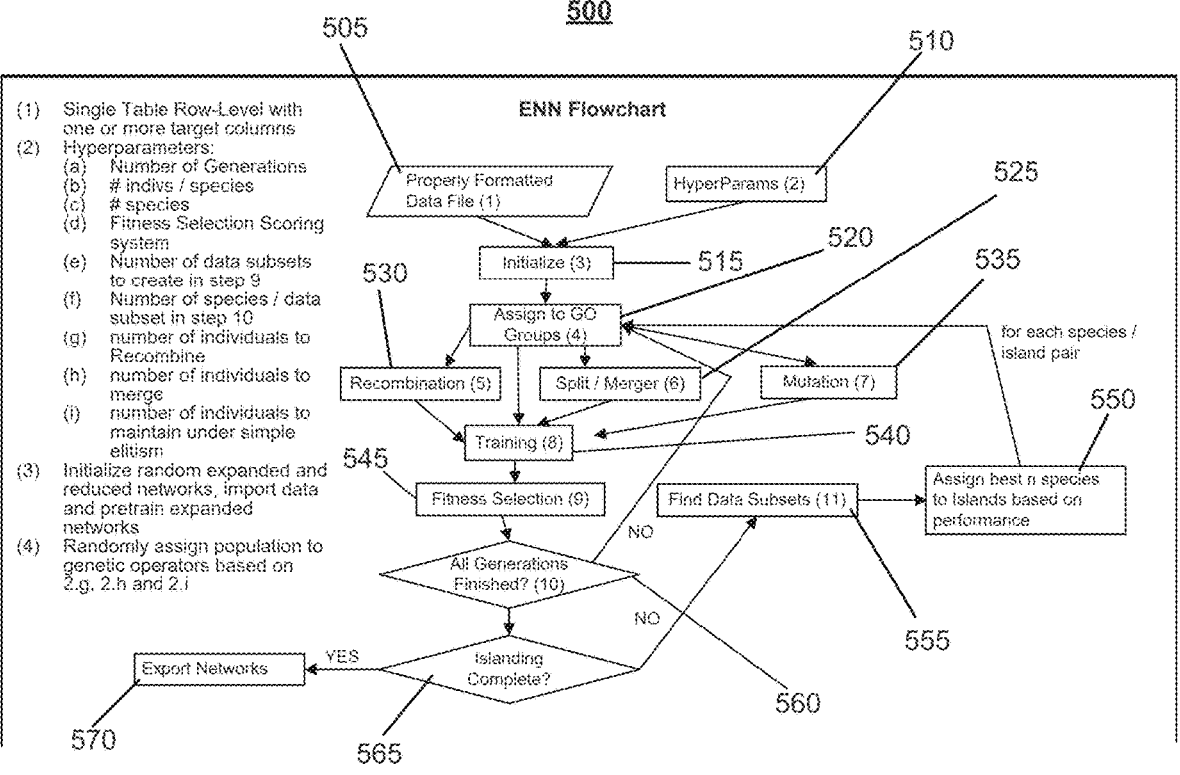
FIG. 5 is a flow diagram of an exemplary method for generating evolving neural networks according to an exemplary embodiment of the present disclosure.
Figure 6:
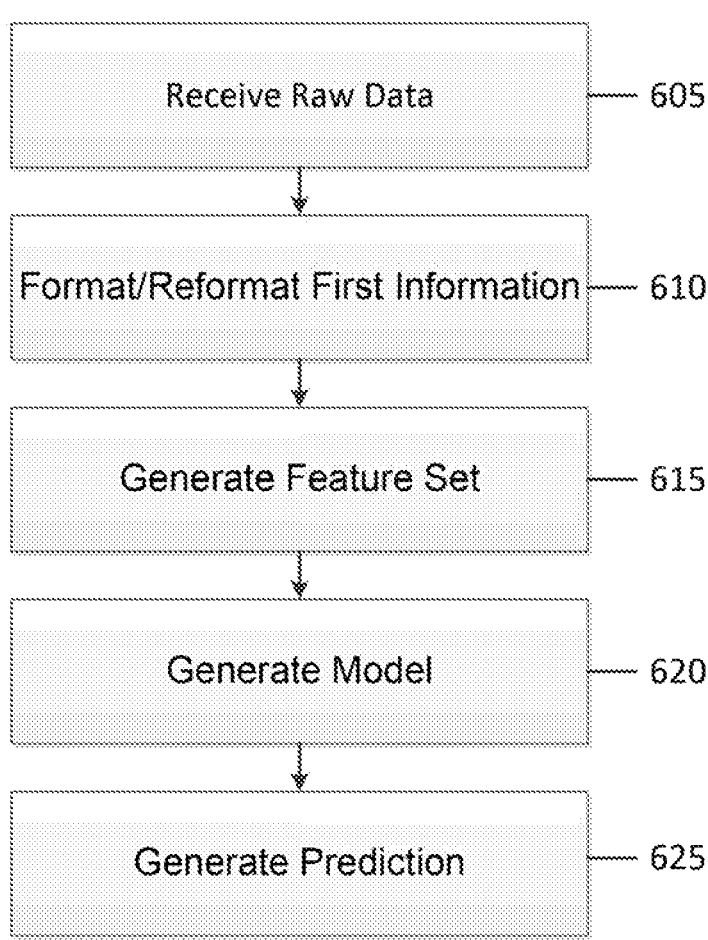
FIG. 6 is a flow diagram of the exemplary method for generating a model according to another exemplary embodiment of the present disclosure.

FIG. 5 shows a flow diagram of an exemplary method 500 for generating evolving neural networks according to an exemplary embodiment of the present disclosure, which can be implemented using the exemplary system shown in FIG. 6. For example, at procedure 505, a data file can be received (e.g., a properly formatted data file). Additionally, at procedure 510, hyper parameters can be received, and the combined hyper parameters and data file can be initialized at procedure 515. At procedure 520, the data can be assigned to one or more GO groups. The data assigned to the GO groups at procedure 520 can be (i) recombined at procedure 530, (ii) mutated at procedure 535, (iii) split/merged at procedure 525 or used for training at procedure 540. The outputs of procedure 525, 530 and 530, can also be used for training at procedure 540. At procedure 545, a fitness selection can be made, and a determination can be made at procedure 560 as to whether all generations have been finished. If they have not been finished, then the exemplary method can proceed back to procedure 520. If all generations have been finished at procedure 560, then a determination can be made at procedure 565 as to whether islanding has completed. If islanding has completed, then the networks can be exported at procedure 570. If islanding has not been completed, then the exemplary method can continue to procedure 555, where data subsets can be located, which can be used to assign the best n species to islands, based on the performance, at procedure 550. After procedure 550, the exemplary method can continue again at procedure 520.

FIG. 6 shows a flow diagram of an exemplary method 600 for generating a model according to an exemplary embodiment of the present disclosure. For example, at procedure 605, raw data can be received, which can be formatted, or reformatted at procedure 610. At procedure 615, a feature set can be generated. The model can be generated at procedure 620, which can be based on the formatted raw data and the feature set. At procedure 625, a prediction can be generated based on the model.

Figure 7:
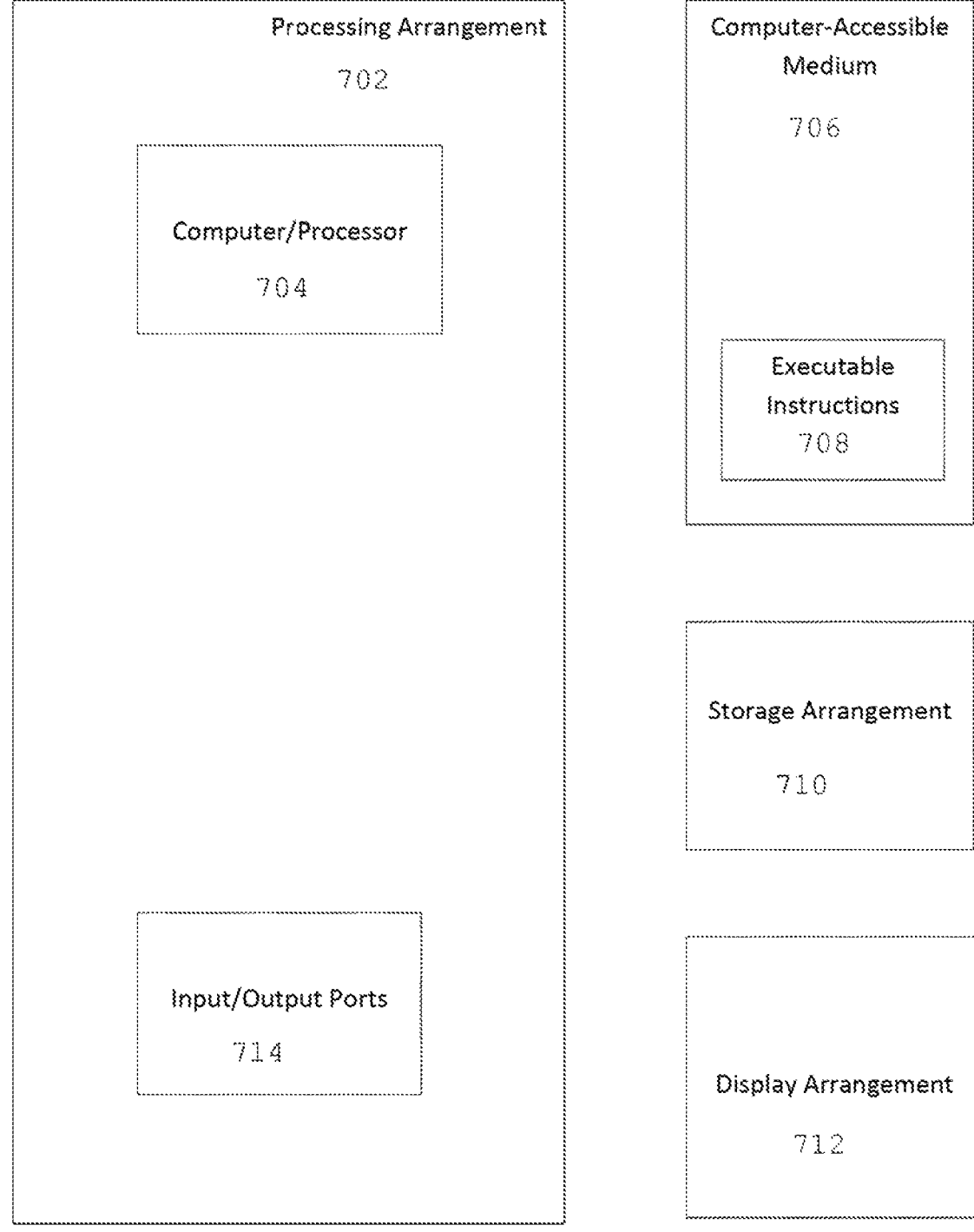
FIG. 7 is an illustration of an exemplary block diagram of an exemplary system in accordance with an exemplary embodiment of the present disclosure.

FIG. 7 shows a block diagram of an exemplary embodiment of a system according to the present disclosure. For example, exemplary procedures in accordance with the present disclosure described herein can be performed by a processing arrangement and/or a computing arrangement 702. Such exemplary processing/computing arrangement 702 can be, for example entirely or a part of, or include, but not limited to, a computer/processor 704 that can include, for example one or more microprocessors, and use instructions stored on a computer-accessible medium (e.g., RAM, ROM, hard drive, or other storage device).

As shown in FIG. 7, for example a computer-accessible medium 706 (e.g., as described herein above, a storage device such as a hard disk, floppy disk, memory stick, CD-ROM, RAM, ROM, etc., or a collection thereof) can be provided (e.g., in communication with the processing arrangement 702). The computer-accessible medium 706 can contain executable instructions 708 thereon. In addition or alternatively, a storage arrangement 710 can be provided separately from the computer-accessible medium 706, which can provide the instructions to the processing arrangement 702 so as to configure the processing arrangement to execute certain exemplary procedures, processes and methods, as described herein above, for example.

Further, the exemplary processing arrangement 702 can be provided with or include an input/output arrangement 714, which can include, for example a wired network, a wireless network, the internet, an intranet, a data collection probe, a sensor, etc. As shown in FIG. 7, the exemplary processing arrangement 702 can be in communication with an exemplary display arrangement 712, which, according to certain exemplary embodiments of the present disclosure, can be a touch-screen configured for inputting information to the processing arrangement in addition to outputting information from the processing arrangement, for example. Further, the exemplary display 712 and/or a storage arrangement 710 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

What is claimed is:

1. A non-transitory computer-accessible medium having stored thereon computer-executable instructions for generating at least one model, wherein, when a computer arrangement executes the instructions, the computer arrangement is configured to perform procedures, comprising:

receiving first information related to raw data;

generating second information by formatting the first information, the second information comprising a plurality of data columns;

determining a potential informational value of each of the plurality of data columns;

determining a covariance between each of the plurality of data columns; and generating third information comprising a feature set based on the determined potential informational value of each of the plurality of data columns and the covariance between each of the plurality of data columns;

generating fourth information comprising metadata related to the second information; and generating the at least one model using an islanding procedure based on the second and third information, wherein the islanding procedure includes:

generating, using the computer arrangement, a plurality of islands comprising subset clusters of the second information without regard to a class variable, generating a plurality of species comprising groups of evolutionary neural networks using the computer arrangement, evaluating the performance of the plurality of species on each of the plurality of generated islands, assigning a fraction of the plurality of species to each of the plurality of islands to be species-island pairs based on the performance of the species on each island, and continuing an evolution of each of the species-island pairs for a fraction of a number of generations used on a full data set.

2. The computer-accessible medium of claim 1, wherein the computer arrangement is further configured to (i) receive fifth information related to a user-defined regularization of the second information, and (ii) generate sixth information based on a reformatting of the second information using the fourth information.

3. The computer-accessible medium of claim 1, wherein the computer arrangement is further configured to generate at least one prediction based on the at least one model.

4. The computer-accessible medium of claim 3, wherein the computer arrangement is further configured to generate the at least one prediction based on at least one time horizon.

5. The computer-accessible medium of claim 3, wherein computer arrangement is further configured to generate a plurality of equations based on a plurality of combinations of a set of data columns of the data columns.

6. The computer-accessible medium of claim 3, wherein the computer arrangement is further configured to determine fifth information related to how a first data column of the data columns is linked with at least one further data column of the data columns.

7. The computer-accessible medium of claim 6, wherein the computer arrangement is further configured to generate the third information based on the second information.

8. The computer-accessible medium of claim 7, wherein the computer arrangement is further configured to assign a score to each set of the feature sets based on a correlation of each respective one of the feature sets to the at least one prediction.

9. The computer-accessible medium of claim 8, wherein the computer arrangement is further configured to select a particular feature set based on the score.

10. The computer-accessible medium of claim 1, wherein the computer arrangement is configured to assign the one or more species based on a performance of each subset.

11. The computer-accessible medium of claim 10, wherein the performance includes a comparison of each subset relative to its historical performance.

12. The computer-accessible medium of claim 1, wherein the computer arrangement is configured to generate the at least one model using at least one neural network, and wherein the at least one neural network comprises a bi-chromosomal neural network having at least two separate neural networks whose results are combined and weighted.

13. The computer-accessible medium of claim 12, wherein the at least one neural network is at least one evolutionary neural network.

14. The computer-accessible medium of claim 13, wherein the at least one evolutionary neural network is at least one evolutionary neural network with at least one of at least one mutation or at least one recombination.

15. The computer-accessible medium of claim 14, wherein the at least one of the at least one mutation or the at least one recombination includes at least one rate that is tunable using at least one hyperparameter.

16. The computer-accessible medium of claim 1, wherein the potential information value is determined using a regression.

17. The computer-accessible medium of claim 1, wherein the potential informational value is generated for each of a plurality of columns created in the second information.

18. The computer-accessible medium of claim 17, wherein the computer arrangement is further configured to generate a feature set comprising a plurality of features based on the third information and feedback on performance relating to each of the plurality of columns created in the second information.

19. The computer-accessible medium of claim 18, wherein the metadata is related to the feature set.

20. The computer-accessible medium of claim 1, wherein the computer arrangement is configured to refine a classification target based on at least one of a plurality of time horizons and one or more data groupings from the plurality of data columns.

21. A method for generating at least one model, comprising:

receiving first information related to raw data;

generating second information by formatting the first information, the second information comprising a plurality of data columns;

determining a potential informational value of each of the plurality of data columns;

determining a covariance between each of the plurality of data columns; and generating third information comprising a feature set based on the determined potential informational value of each of the plurality of data columns and the covariance between each of the plurality of data columns;

generating fourth information comprising metadata related to the second information; and using a computer hardware arrangement, generating the at least one model using an islanding procedure based on the second and third information, wherein the islanding procedure includes:

generating, using the computer hardware arrangement, a plurality of islands comprising subset clusters of the second information without regard to a class variable, generating a plurality of species comprising groups of evolutionary neural networks using the computer arrangement, evaluating the performance of the plurality of species on each of the plurality of generated islands, assigning a fraction of the plurality of species to each of the plurality of islands to be species-island pairs based on the performance of the species on each island, and continuing an evolution of each of the species-island pairs for a fraction of a number of generations used on a full data set.

22. A system for generating at least one model, comprising:

at least one computer hardware arrangement configured to:

receive first information related to raw data;

generate second information by formatting the first information, the second information comprising a plurality of data columns;

determine a potential informational value of each of the plurality of data columns;

determine a covariance between each of the plurality of data columns; and generate third information comprising a feature set based on the determined potential informational value of each of the plurality of data columns and the covariance between each of the plurality of data columns;

generate fourth information comprising metadata related to the second information; and generate the at least one model using an islanding procedure based on the second and third information, wherein the islanding procedure includes:

generating a plurality of islands comprising subset clusters of the second information without regard to a class variable, generating a plurality of species comprising groups of evolutionary neural networks using the computer arrangement, evaluating the performance of the plurality of species on each of the plurality of generated islands, assigning a fraction of the plurality of species to each of the plurality of islands to be species-island pairs based on the performance of the species on each island, and continuing an evolution of each of the species-island pairs for a fraction of a number of generations used on a full data set.

* * * * *